Jan. 28, 1964 S. L. SEYMOUR 3,119,679
APPARATUS FOR FEEDING GLASS
Original Filed May 26, 1959 2 Sheets-Sheet 1
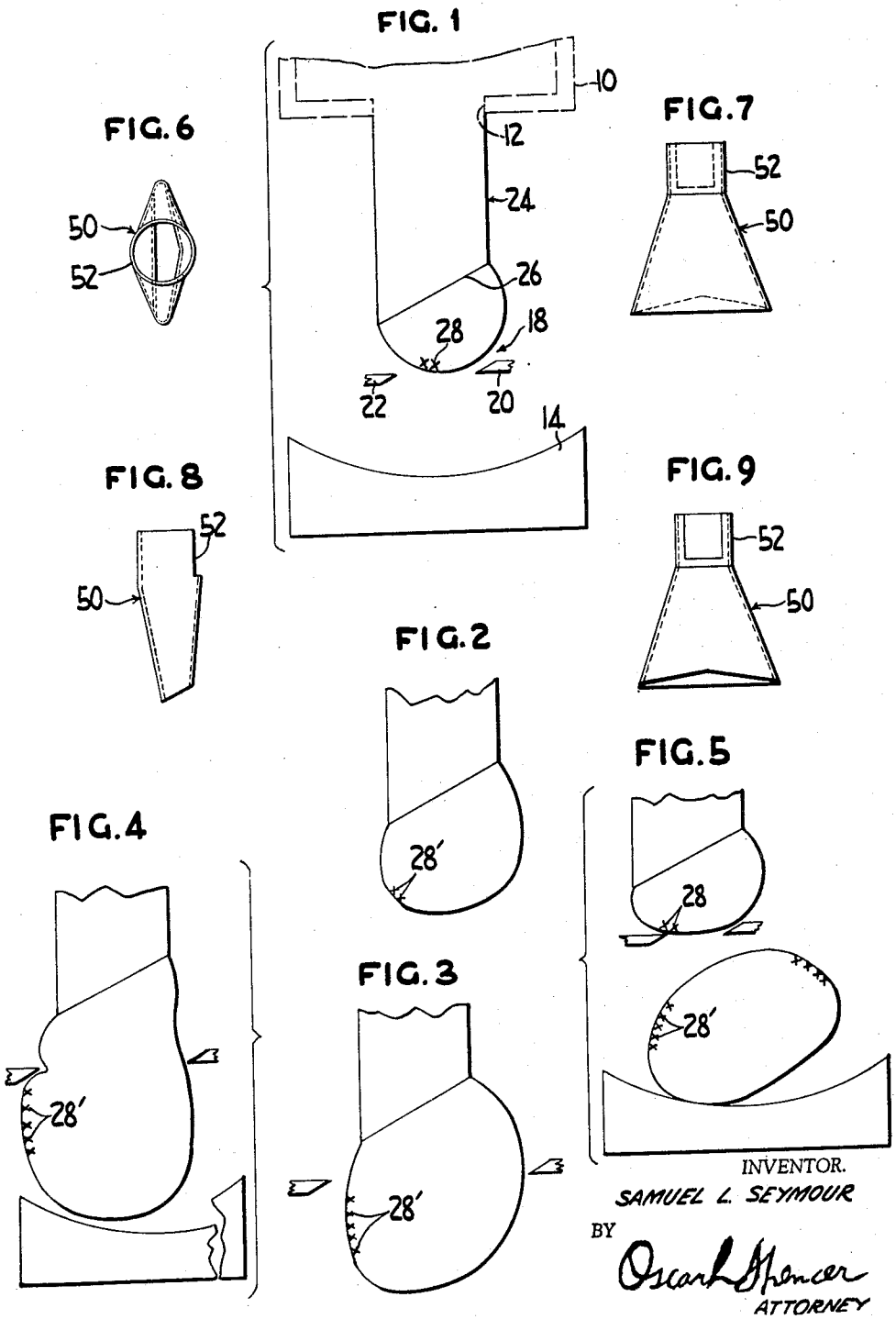
INVENTOR.
SAMUEL L. SEYMOUR
BY Oscar L. Spencer
ATTORNEY Jan. 28, 1964  S. L. SEYMOUR  3,119,679
APPARATUS FOR FEEDING GLASS
Original Filed May 26, 1959  2 Sheets-Sheet 2

INVENTOR.
SAMUEL L. SEYMOUR
BY Oscar L. Spencer
ATTORNEY

United States Patent Office 3,119,679
Patented Jan. 28, 1964

3,119,679
APPARATUS FOR FEEDING GLASS
Samuel L. Seymour, Oakmont, Pa., assignor to Pittsburgh Plate Glass Company, Pittsburgh, Pa., a corporation of Pennsylvania
Original application May 26, 1959, Ser. No. 815,920. Divided and this application Oct. 30, 1961, Ser. No. 148,566
14 Claims. (Cl. 65—127)

This invention relates to feeding molten glass and finds particular use in the production of ophthalmic blanks or the like; or articles wherein the location of shear marks may affect their intended use.

In the manufacture of ophthalmic blanks or the like, molten glass is discharged generally downwardly from the orifice of a glass melting furnace and is sheared by means of conventional shear blades into gobs of molten glass of predetermined weight. In one method of manufacture the gobs of molten glass are directed or merely fall into a mold for subsequent pressing into blanks of desired size. In another form of manufacture the molten glass is directed onto a prepared ground and polished countersink of a major glass element blank and is sheared from the stream, the molten glass then flowing across the countersink to fill the countersink and seal to the prepared surface. This latter is commonly known as a flow-form process.

In both of the methods above described the location of shear marks is quite important. In the first method described, shear marks in the center areas of both surfaces may cause the blank to be rejected because such marks can be of such surface depth that they require considerable glass removal to erase when the blank is subsequently ground and polished into a finished lens for ultimate use. In the second method, a shear mark at the interface of the major blank and the glas which has flowed into the prepared countersink will cause rejection of the blank because the shear mark cannot be removed by subsequent operations. As will be obvious to one skilled in the art the shear marks affect both the optical and the physical quality of blanks made by either method.

The present invention has for its primary objective the provision of apparatus for overcoming the deficiency of the above enumerated methods and the ultimate effects of the location of the shear marks therein. The present invention allows the shear mark position to be controlled, so that the shear marks will be located on the blanks in such positions that they will be subsequently easily removed by the finishing operation to which the blanks will necessarily be subjected. In the first described method, it is desirable to locate the shear marks closely adjacent the rim of the blank and in the second described method, it is desirable and necessary to locate the shear marks outside the edge of the countersink and on glass which will be removed by the finishing operation.

Broadly, the invention herein described contemplates asymmetrically gathering gobs of molten glass at the terminal glas discharge end of an orifice tube extension connected to the orifice of a glass melting tank, which orifice tube extension provides the asymmetrical gathering and causes a curing action of the gob, so that the shear cut is displaced from the bottom of the gob to a side of the gob, approximately 90 degrees removed from its initial position.

In following the first named method, the initial shear mark is turned 90 degrees by the above mentioned curling action and in so doing is drawn out as the gob falls toward the back side of the mold, and the severed gob is then given a forward kick by the crossing of the shear blades causing a drawing out of the top shear mark on the gob as it settles in the mold. The extremities of the shear marks will thus be located at the extremities of the gob when in the mold, and the shear marks between the extremities will be drawn out which reduces their surface depth considerably.

In the second named method, the asymmetrical gathering and curling action insures that the initial shear mark will be located adjacent to and outside the prepared countersink of the major blank, so that the shear marks will not affect the optical qualities of the finished blanks.

Another feature of this invention resides in the spreading of a stream of glass in addition to the control of the location of the shear marks, so as to allow the glass to spread more evenly while in molten state. This latter feature is especially advantageous in following the second described method of forming multifocal lens blanks. The means by which the molten glass is controlled, i.e., asymmetrically gathered to provide the broadly described results will be set forth in the following specification.

Referring now to the appended drawings, wherein like reference characters refer to like parts:

FIGURE 1 is a partial longitudinal section of a glass melting furnace with an orifice tube extension constructed in accordance with the invention connected to the furnace orifice and the relation of shear blades to the descending stream of molten glass, the shear blades having cut a gob of glass from the stream;

FIGURE 2 is similar to FIGURE 1, except that the melting tank is not shown and illustrates the curling of the gob of glass and the shear mark in an intermediate location;

FIGURE 3 is similar to FIGURE 2 and illustrates the shear mark in its location just prior to a shearing of the gob;

FIGURE 4 is similar to FIGURE 3 and illustrates the gob of glass being sheared from the stream of glass;

FIGURE 5 illustrates the manner in which the sheared gob is kicked and the shear mark locations thereon with respect to a mold;

Figure 11:
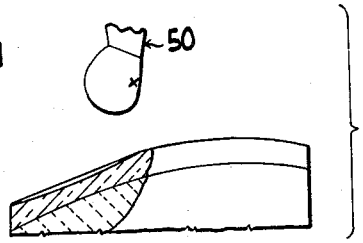
Figure 12:
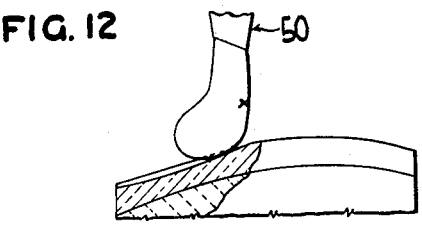
Figure 13:
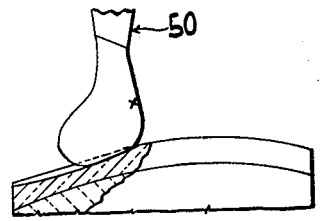
Figure 14:
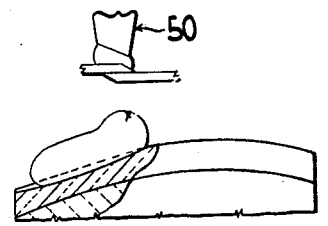

FIGURES 6, 7, 8 and 9 illustrate a different form of orifice tube extension especially useful in flow forming of ophthalmic blanks in which the stream of glass is also spread; and FIGURES 10, 11, 12, 13, 14 and 15 illustrate the shearing of the stream of glass from the orifice tube extension shown in FIGURES 6, 7, 8 and 9 and the location of the shear marks on the molten glass as it issues from the orifice tube extension and as it flows and forms the minor element of the multifocal lens blank.

Referring now to the drawings, and in particular to FIGURE 1, there is shown a conventional glass melting tank 10 having an orifice 12 through which molten glass in the form of a stream is discharged generally downwardly. Positioned beneath the orifice is a mold 14 mounted, for example, on the table 16 of a turret machine. Intermediate the orifice 12 and the mold 14 is a glass shearing means 18 of conventional construction having movable overlapping shear blades 20, 22. The shear blades shear the stream of glass into gobs of predetermined weight, depending on the product being manufactured, which fall or are directed into the molding cavity of the mold 14. Indexing of the mold table will position a filled mold under a plunger (not shown, but which is conventional in construction) for subsequent pressing of the gob of molten glass into the desired shape, such as an ophthalmic blank of predetermined contour and thickness.

One form of orifice tube extension by which the shear marks on the gob of molten glass and therefore on the finished pressed article can be located with respect to optical properties of the article is shown in FIGURES 1 to 5 and comprises a substantially cylindrical orifice extension member 24 having its terminal, glass discharge end 26 angled with respect to the horizontal, such for example, the plane of the table 16. The member 24 is constructed of a material which does not react with the molten glass, such as platinum, for otherwise seeds or other gaseous inclusions or stones could be formed and cause rejection of the article.

The angle defined by the terminal end 26 and the major longitudinal axis of the member 24 may be from 15 degrees to 45 degrees; however, it has been found that preferably this angle is approximately 30 degrees.

A stream of molten glass flows from the orifice 12 and through the member 24, issuing from the terminal end 26 of the member 24. As the glass collects at the terminal end 26 of the member 24, it flows outwardly away from the major longitudinal axis of the member 24 giving rise to the asymmetrical flow previously described. This flow occurs because portions of the glass are subjected to greater contact time with the interior of the member 24 than other portions. In other words, the orifice tube extension provides a confined zone in which longitudinal portions of the glass flowing therethrough are retarded in passing from the tank orifice to the exit end of the extension. Thus, as the glass continues to discharge and collect to a mass of a desired weight, the shear mark noted at 28 initially at the extreme lower end of the glass moves to a position on the side of the mass of glass or approximately 90 degrees removed from its initial position. Thus, the orifice tube extension causes a curling of the mass of glass collected at its terminal end to be sheared into a gob for molding. Upon shearing the collected mass of glass, the initial shear mark 28 and the newly formed shear mark 28' on the bottom of the stream are approximately 90 degrees removed from each other, rather than the normal 180 degrees. The sheared gob of glass, indicated by the reference character 30 is given a kick by the shears and falls into the molding cavity with the shear marks 28 and 28' facing upwardly and closely adjacent the edges of the mold cavity, so that upon subsequent pressing the shear marks will spread apart toward the outer extremities or edges of the finished article.

Attention is now directed to FIGURES 6 to 9 wherein a second form of an orifice tube extension by which the objects of this invention may be accomplished is illustrated. This orifice tube extension, identified as 50, replaces the member 24 in FIGURES 1 to 5. The member 50 is preferably used in the flow form process of manufacturing multifocal lens blanks and is therefore constructed in such a manner to spread the stream horizontally, so that the glass issuing therefrom quickly covers the prepared countersink in a major element blank.

The member 50 comprises a first, substantially right cylindrical portion 52 having splits therein for connection with the orifice of the tank furnace, and a second outwardly tapered portion 54 having a cross sectional configuration varying from substantially circular to elongated oval. The member 50, as illustrated, terminates angularly, as at 54, with respect to the horizontal, similarly to the member 24. The leading and trailing portions of the member 50 are angularly disposed with respect to the longitudinal axis of the tank orifice. These tapers, which may or may not be equal, are desirable to assist in spreading the stream of glass for the intended purpose.

Figure 10:
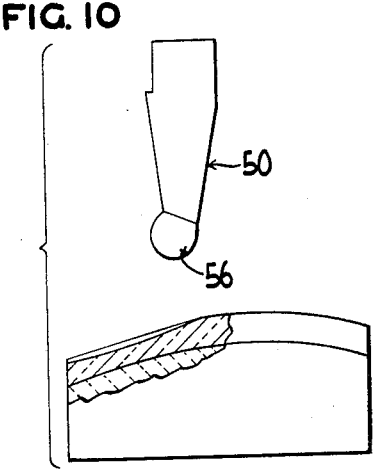
Figure 15:

Attention is now directed to FIGURES 10 to 15 showing the modified form of orifice tube extension in use in flow forming multifocal lens blanks. In this operation, the molten glass is sheared after it contacts the prepared countersink of the major element blank and partially flows over and fills the countersink. As shown in FIGURE 10, the original shear mark, identified as 56, is at the extreme bottom of the stream of molten glass flowing from the tank orifice and through the member 50. As the glass continues to flow, the mass of glass issuing from the member 50 is displaced horizontally from the longitudinal axes of the tank orifice and the member 50 because portions of the glass remain in contact with the interior of the member 50 for a greater length of time than other portions. Thus, the shear mark is displaced from its lowermost initial position by a curling action of the mass of glass and its change in position may be observed in FIGURES 11 to 14. The flow of glass continues and contacts the countersink 58 of the major element blank 60, and as is observed in FIGURE 13, the original shear mark is free from contacting the prepared countersink of the major element blank. When a sufficient quantity of glass is deposited adjacent the edge of the countersink to fill the countersink the stream of glass is sheared and the glass which has been sheared from the main stream flows downwardly across the prepared countersink to fill the countersink without trapping air at the interface. The newly formed shear mark 56' is located on the outer surface of the formed blank, and the original shear mark 56 is located in a mass of glass to be subsequently removed by the subsequent finishing operations necessary to convert the blank into the final product.

In both modifications described above, it will be observed that the flow of glass is asymmetrical with respect to the major vertical axis of the furnace orifice and the orifice tube extension, this being caused by the angularity of the terminal glass discharge end of the extension member. The asymmetrical flow of glass from the extension member causing the molten glass discharging therefrom to curl and thus change the position of the initial shear mark on the mass of glass. The angularity of the extension member results in portions of the stream of glass passing therethrough to remain in contact with the extension member for longer periods of time than other portions of the glass.

The same results may be obtained with modifications of the extension member which would be apparent to one skilled in the art. For example, the orifice tube extension could be angularly positioned with respect to the tank orifice so that its longitudinal axis would be also angled with respect to the tank orifice and in such construction, the terminal glass discharge end thereof would be substantially perpendicular to the vertical axis of the tank orifice but angled with respect to the longitudinal axis of the extension. Another construction is a right cylindrical tube extension member with a portion of its terminal, glass discharge end obstructed with a horizontal or substantially horizontal plate member or the extension could be provided with an angled extending plate at a portion of its periphery. The orifice tube extension can be of any suitable cross-section, for example, square, rectangular or oval without departing from the spirit of the invention. Other modifications will be apparent to one skilled in the art without departing from the spirit of the invention.

This application is a division of my copending application, Serial No. 815,920, filed May 26, 1959.

I claim:

1. In combination with a glass furnace having a vertically positioned orifice tube and substantially horizontally positioned shear means to shear glass as it issues from said orifice, the improvement comprising a generally downwardly directed orifice tube extension connected to said orifice through which the molten glass passes to be discharged and sheared into separate masses of molten glass by said shear means, said orifice tube extension having substantially diametrically opposed portions of different lengths so that molten glass being discharged therethrough remains in contact with one portion of said member for a greater length of time than with another portion, said extension thereby directing the flow of glass away from the longitudinal axis of said extension and said orifice causing said stream of molten glass issuing therefrom to curl and change the position of the initial shear mark on the lowermost portion of the descending stream of glass relative to the mass of glass being sheared and to the descending stream of glass.

2. Apparatus as recited in claim 1 wherein said orifice tube extension is a cylindrical member having its glass discharge end formed obliquely relative to its longitudinal axis.

3. Apparatus as recited in claim 1 wherein said orifice tube extension is a rectangular shaped member.

4. Apparatus as recited in claim 1 wherein said orifice tube extension is an oval shaped member.

5. Apparatus as recited in claim 1 wherein said orifice tube extension is a substantially cylindrical member and includes an obstruction connected thereto at its glass discharge end partially covering the outlet thereof.

6. Apparatus as recited in claim 1 wherein said orifice tube extension is provided with an angled extending plate at a portion of its periphery.

7. In combination with a glass melting furnace having an orifice tube for discharging a generally downwardly directed stream of molten glass and shear means for shearing the stream of molten glass discharging from said orifice tube, the improvement comprising an extension connected to said orifice tube through which said stream of molten glass passes to be thus discharged and sheared into discrete masses of molten glass, said orifice tube extension including a generally downwardly directed hollow member having a longitudinal axis and a glass discharge end formed obliquely relative to said axis, said orifice tube extension providing an asymmetrical discharge of glass therefrom so that a shear mark on the discharging stream of glass is displaced from its original location to a new location approximately 90 degrees removed.

8. The apparatus recited in claim 7 wherein said orifice tube extension is a vertically downwardly directed member.

9. The apparatus recited in claim 7 wherein said orifice tube extension is a hollow member of cylindrical section.

10. The apparatus recited in claim 7 wherein said orifice tube extension is a hollow member having a portion of its length of cylindrical section and another portion of its length of oval shape of increasing dimensions so as to spread the stream of glass discharging therefrom.

11. The apparatus recited in claim 7 wherein the terminal glass discharge end of said orifice tube extension defines an angle of 15 degrees to 45 degrees with said axis.

12. The apparatus recited in claim 7 wherein the terminal glass discharge end of said orifice tube extension defines an angle of 30 degrees with said axis.

13. The apparatus recited in claim 7 wherein the longitudinal axis of said orifice tube extension is angled from said orifice.

14. The apparatus recited in claim 13 wherein the glass discharge terminal end of said orifice extension is in a substantially horizontal plane.

References Cited in the file of this patent

UNITED STATES PATENTS

| | | |
|---|---|---|
| 1,439,369 | La France | Dec. 19, 1922 |
| 1,790,984 | Greer | Feb. 3, 1931 |
| 2,734,315 | Poundstone | Feb. 14, 1956 |